US008126720B2

(12) United States Patent
Nakagawa et al.

(10) Patent No.: US 8,126,720 B2
(45) Date of Patent: Feb. 28, 2012

(54) IMAGE CAPTURING APPARATUS AND INFORMATION PROCESSING METHOD

(75) Inventors: Kenichiro Nakagawa, Tokyo (JP); Tsuyoshi Yagisawa, Kawasaki (JP); Toshiaki Fukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 12/257,798

(22) Filed: Oct. 24, 2008

(65) Prior Publication Data

US 2009/0109297 A1  Apr. 30, 2009

(30) Foreign Application Priority Data

Oct. 25, 2007 (JP) ................................ 2007-278054
Jun. 30, 2008 (JP) ................................ 2008-171241
Aug. 5, 2008 (JP) ................................ 2008-202423

(51) Int. Cl.
*G10L 21/00* (2006.01)
(52) U.S. Cl. ........................ 704/275; 704/270
(58) Field of Classification Search .................. 704/270, 704/275
See application file for complete search history.

(56) References Cited

U.S. PATENT DOCUMENTS

| | | | |
|---|---|---|---|
| 4,951,079 A * | 8/1990 | Hoshino et al. ................. 396/56 |
| 5,546,145 A * | 8/1996 | Bernardi et al. ............... 396/312 |
| 5,729,741 A * | 3/1998 | Liaguno et al. ..................... 1/1 |
| 6,031,526 A * | 2/2000 | Shipp ............................ 715/201 |
| 6,101,338 A * | 8/2000 | Bernardi et al. ............... 396/287 |
| 6,289,140 B1 * | 9/2001 | Oliver ............................ 382/313 |
| 6,499,016 B1 * | 12/2002 | Anderson ..................... 704/275 |
| 6,721,001 B1 * | 4/2004 | Berstis ....................... 348/231.3 |
| 7,053,938 B1 * | 5/2006 | Sherry ....................... 348/231.4 |
| 7,324,943 B2 * | 1/2008 | Rigazio et al. ................ 704/270 |
| 7,511,741 B2 * | 3/2009 | Son ........................... 348/231.2 |
| 7,529,772 B2 * | 5/2009 | Singh .................................. 1/1 |
| 7,656,426 B2 * | 2/2010 | Yamaya ..................... 348/207.1 |
| 7,933,508 B2 * | 4/2011 | Konicek ......................... 396/51 |
| 2001/0056342 A1 * | 12/2001 | Piehn et al. ....................... 704/3 |
| 2004/0263664 A1 | 12/2004 | Aratani et al. |
| 2005/0075881 A1 * | 4/2005 | Rigazio et al. ................ 704/270 |
| 2005/0192808 A1 * | 9/2005 | Sugiyama ..................... 704/270 |
| 2008/0062280 A1 * | 3/2008 | Wang et al. ................ 348/231.99 |

FOREIGN PATENT DOCUMENTS

| | | |
|---|---|---|
| JP | 2001-305642 A | 11/2001 |
| JP | 2005-012674 A | 1/2005 |
| JP | 2006-164229 A | 6/2006 |

* cited by examiner

*Primary Examiner* — Douglas Godbold
(74) *Attorney, Agent, or Firm* — Carter, DeLuca, Farrell & Schmidt, LLP

(57) ABSTRACT

An image capturing apparatus of this invention includes an audio acquisition unit which acquires audio data, an speech processing unit which analyzes the acquired audio data and detects predetermined audio data, an image capturing unit which captures image data by activating a shutter when the speech processing unit detects the predetermined audio data, and a storage unit which stores the audio data acquired by the audio acquisition unit before the shutter is activated in association with image data captured upon activating the shutter.

10 Claims, 14 Drawing Sheets

FIG. 3

| | AUDIO DATA | IMAGE DATA |
|---|---|---|
| 1 | 001.wav | 001.jpg |
| 2 | 002.wav | 002.jpg |
| 3 | 003.wav | 003.jpg |
| ... | ... | ... |

107

| | SPEAKER INFORMATION | IMAGE DATA |
|---|---|---|
| 1 | Jarke | 001.jpg |
| 2 | morgan | 002.jpg |
| 3 | Jarke | 003.jpg |
| ... | ... | ... |

404

UTTERANCE DURATION/IMAGE CAPTURING TIMING TABLE  1401

|   | UTTERANCE DURATION | IMAGE CAPTURING TIMING |
|---|---|---|
| 1 | LESS THAN 0.5 SEC | 0.4 SEC AFTER RECOGNITION |
| 2 | 0.5 SEC (INCLUSIVE) AND 1 SEC (EXCLUSIVE) | 0.6 SEC AFTER RECOGNITION |
| 3 | 1 SEC OR MORE | 0.8 SEC AFTER RECOGNITION |
| ... | ... | ... |

IMAGE CAPTURING APPARATUS AND INFORMATION PROCESSING METHOD

BACKGROUND OF THE INVENTION

1. Field of the Invention

The present invention relates to a processing technique for processing image data captured using an image capturing apparatus which can input audio data.

2. Description of the Related Art

In recent years, the progress of digital cameras as image capturing apparatuses is amazing. For example, digital cameras, which have an audio function that can input, process, and output audio data, also have appeared.

As an audio function in a digital camera, for example, a voice memo function is known. With this function, a microphone is connected, and a memo of audio data input by the user via the microphone is appended to captured image data.

As another audio function, an audio shutter function described in Japanese Patent Laid-Open No. 2001-305642 is available. The audio shutter function automatically activates a shutter when a digital camera recognizes a specific user's utterance such as "Say cheese!" or "Smile!". This function has already been adopted in actual products as a function effective for a case in which a photographer cannot access a shutter button since the photographer himself or herself is an object, or a case in which a photographer wants to prevent hand-shaking upon pressing the shutter button, and so forth.

Furthermore, with the advent of digital cameras with such audio functions, a function of processing image data captured by an image capturing apparatus using corresponding audio data is also available.

In general, many users upload captured image data to apparatuses such as a personal computer (to be abbreviated as a PC hereinafter), Set Top Box (to be abbreviated as an STB hereinafter), and the like, and then execute a browse process, edit process, print process, and so forth of the data. For this reason, the function of processing image data using audio data is often implemented on such apparatuses.

More specifically, Japanese Patent Laid-Open No. 2006-164229 and Japanese Patent Laid-Open No. 2005-12674 disclose a technique which outputs specific audio data (predetermined BGM or voice memo) when image data captured by an image capturing apparatus are fetched into a PC, and are played back as a slideshow.

Also, a technique which identifies a speaker using a voice memo appended to image data upon uploading image data captured by an image capturing apparatus to a PC or STB, and records the identification result as photographer information in association with the image data is known. With this technique, uploaded image data can be searched based on the photographer information.

However, in order to process image data using a voice memo appended to the captured image data, the user needs to append voice memos to respective image data in advance, resulting in inconvenience.

Normally, since a voice memo to be appended is input after capturing of image data, if it is output upon playing back image data in a slideshow, the sense of reality is poor.

SUMMARY OF THE INVENTION

The present invention has been made in consideration of the aforementioned problems.

An image capturing apparatus according to an embodiment of the present invention includes an audio acquisition unit configured to acquire audio data, a detection unit configured to detect a voice command included in the audio data, an image capturing control unit configured to acquire image data by controlling an image capturing unit to capture an object image when the voice command is detected, and a storage control unit configured to control a storage unit to store at least one of the audio data which have predetermined time relationships with an utterance timing of the voice command as a voice memo in association with the acquired image data.

According to an aspect of the present invention, upon appending audio data to captured image data so as to process that image data using the audio data, the user's convenience is improved, and audio data with more reality can be appended.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of audio/image storage data 107.

DESCRIPTION OF THE EMBODIMENTS

Various embodiments of the present invention will now be described in detail in accordance with the accompanying drawings.

First Embodiment

<1. Functional Arrangement of Image Capturing Apparatus>

Figure 1:
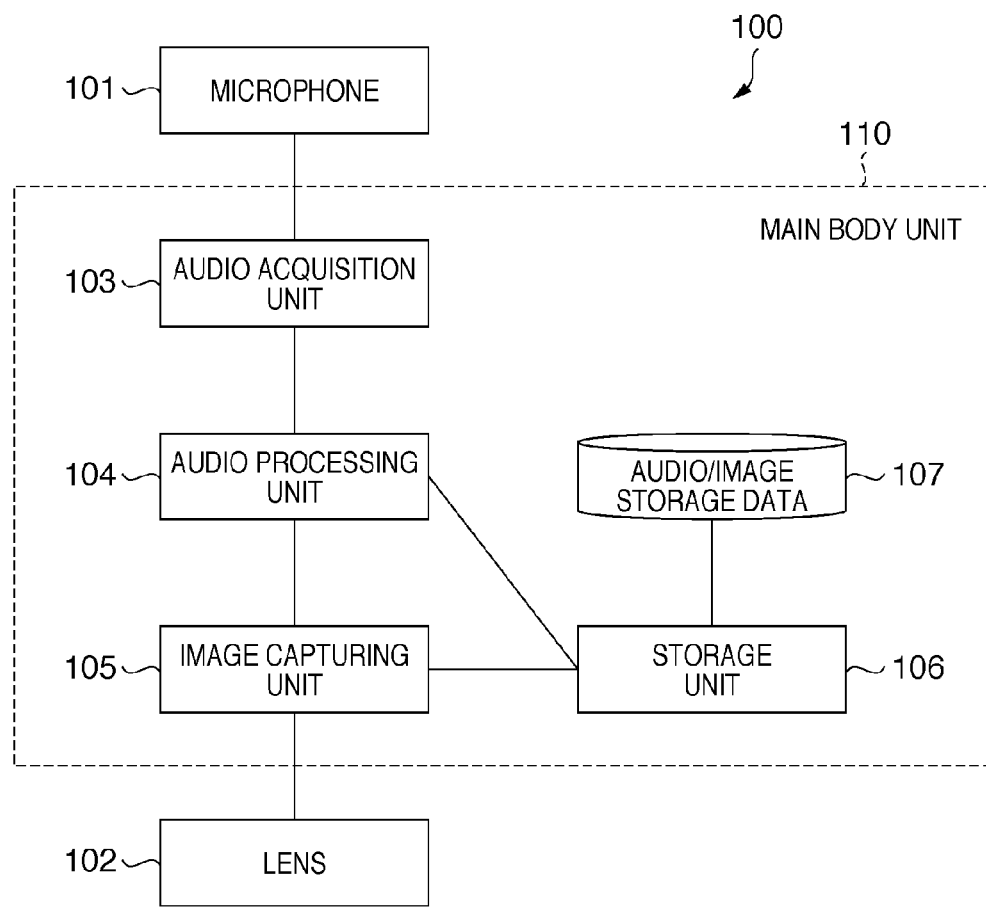
FIG. 1 is a block diagram showing the functional arrangement of an image capturing apparatus according to the first embodiment of the present invention.

FIG. 1 is a block diagram showing the functional arrangement of an image capturing apparatus according to the first embodiment of the present invention. An image capturing apparatus 100 is an image capturing apparatus such as a digital camera or the like, which captures images of a landscape, person, and the like in response to a user's operation or voice command.

A microphone 101 is connected to a main body unit 110 of the image capturing apparatus 100, and fetches a user's utterance as audio data into the main body unit 110 via an audio acquisition unit 103. The fetched audio data is sent to a speech processing unit 104.

The speech processing unit 104 sends the fetched audio data to a storage unit 106, and analyzes the fetched audio data using a speech recognition technique as a state-of-the-art technique.

When the speech processing unit 104 detects audio data indicating a predetermined command (for example, an audio shutter command including a character string "Say cheese!" or the like) as a result of analysis, it notifies an image capturing unit 105 of the audio shutter command.

Upon notification of the audio shutter command by the speech processing unit 104, the image capturing unit (image capturing control unit) 105 captures an object image by activating a shutter and receiving externally incoming light via a lens 102, thus acquiring image data. Note that a mode which activates the shutter based on audio data in this way will be referred to as a "voice shutter mode".

The image data captured by the image capturing unit 105 is sent to the storage unit 106. The storage unit (storage control unit) 106 associates the previously received audio data with the image data, and stores them as audio/image storage data 107.

<2. Sequence of Processing in Voice Shutter Mode in Image Capturing Apparatus>

Figure 2:
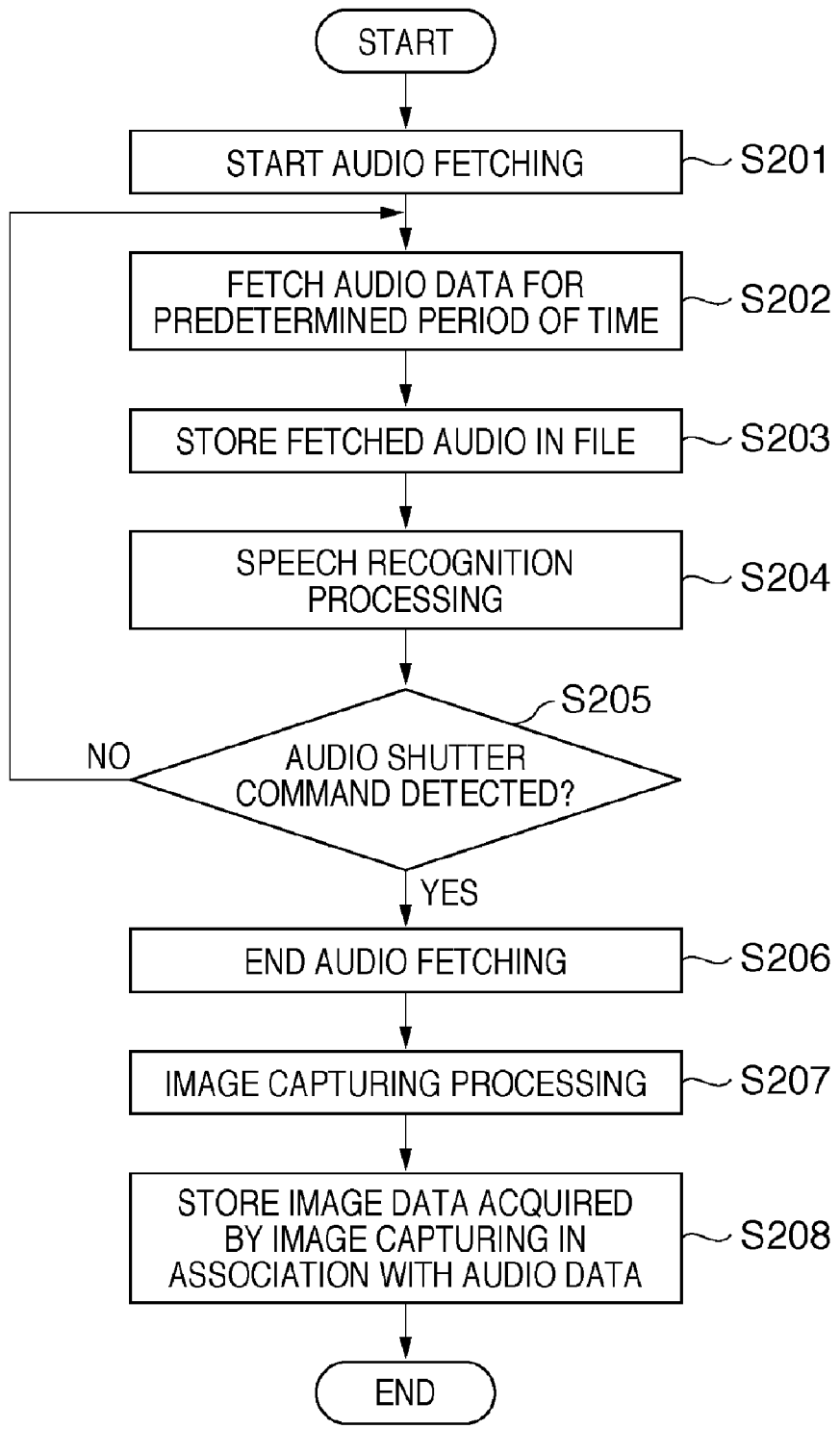
FIG. 2 is a flowchart showing the sequence of processing in a voice shutter mode of an image capturing apparatus 100.

FIG. 2 is a flowchart showing the sequence of processing in the voice shutter mode of the image capturing apparatus 100.

When the user makes an operation for changing a mode to the voice shutter mode, the processing shown in the flowchart of FIG. 2 starts. More specifically, this processing starts when the user presses an audio shutter button (not shown) on the image capturing apparatus 100.

Upon starting the voice shutter mode, the audio acquisition unit 103 begins to acquire audio data sent from the microphone 101 in step S201.

In step S202, count-up for a predetermined time period (e.g., about 0.1 sec) is started. In this way, audio data sent from the microphone 101 is fetched for the predetermined time period. After an elapse of the predetermined time period, the process advances to step S203.

In step S203, the audio data fetched by the audio acquisition unit 103 before the predetermined time period elapses is sent to the storage unit 106.

In step S204, the speech processing unit 104 analyzes, using the speech recognition technique, the audio data fetched by the audio acquisition unit 103 before the predetermined time period elapses.

It is checked in step S205 as a result of analysis of the speech processing unit 104 if a predetermined command (an audio shutter command including a character string "Say cheese!" or the like) is detected. As a result of checking in step S205, if it is determined that no audio shutter command is detected, the process returns to step S202 to repeat the processes in steps S202 to S204 again.

On the other hand, if it is determined that an audio shutter command is detected, the speech processing unit 104 sends the audio shutter command to the image capturing unit 105, and the process then advances to step S206 to end acquisition of the audio data by the audio acquisition unit 103.

In step S207, the image capturing unit 105 executes image capturing processing. In step S208, captured image data and the audio data sent in step S203 are stored in association with each other as audio/image storage data 107 in the storage unit 106.

Note that the analysis of audio data using the speech recognition technique performed in step S204 may be narrowly-defined speech recognition, which converts audio data into text or may be broadly-defined speech recognition, which detects a human utterance.

That is, the shutter may be configured to be activated when some audio data is input after the beginning of acquisition of audio data. With this configuration, the user need not utter any predetermined audio shutter command upon activating the shutter, and can activate the shutter by an ad-lib utterance.

<3. Example of Audio/Image Storage Data>

FIG. 3 shows an example of the audio/image storage data 107. As shown in FIG. 3, the audio/image storage data 107 is stored as a pair of audio data uttered by the user in the voice shutter mode, and captured image data.

As can be seen from the above description, according to this embodiment, an audio uttered by the user until the shutter is activated in the voice shutter mode is fetched as audio data, and that audio data can be stored in association with image data captured at that time.

As a result, the user need not append any voice memo later to acquired image data unlike in the conventional apparatus so as to allow processing of the captured image data using audio data, thus improving the user's convenience.

According to the configuration of this embodiment, since audio data upon activating the shutter is fetched, the audio data with sense of reality upon image capturing can be associated with image data as a voice memo.

Second Embodiment

In the first embodiment, the image capturing apparatus which can store audio data (voice memo) fetched upon image capturing in association with image data has been explained. On the other hand, in the second to fourth embodiments, various kinds of processing in an information processing apparatus to which image data captured by that image capturing apparatus are uploaded together with audio data will be described.

<1. Functional Arrangement of Information Processing Apparatus>

Figure 4:
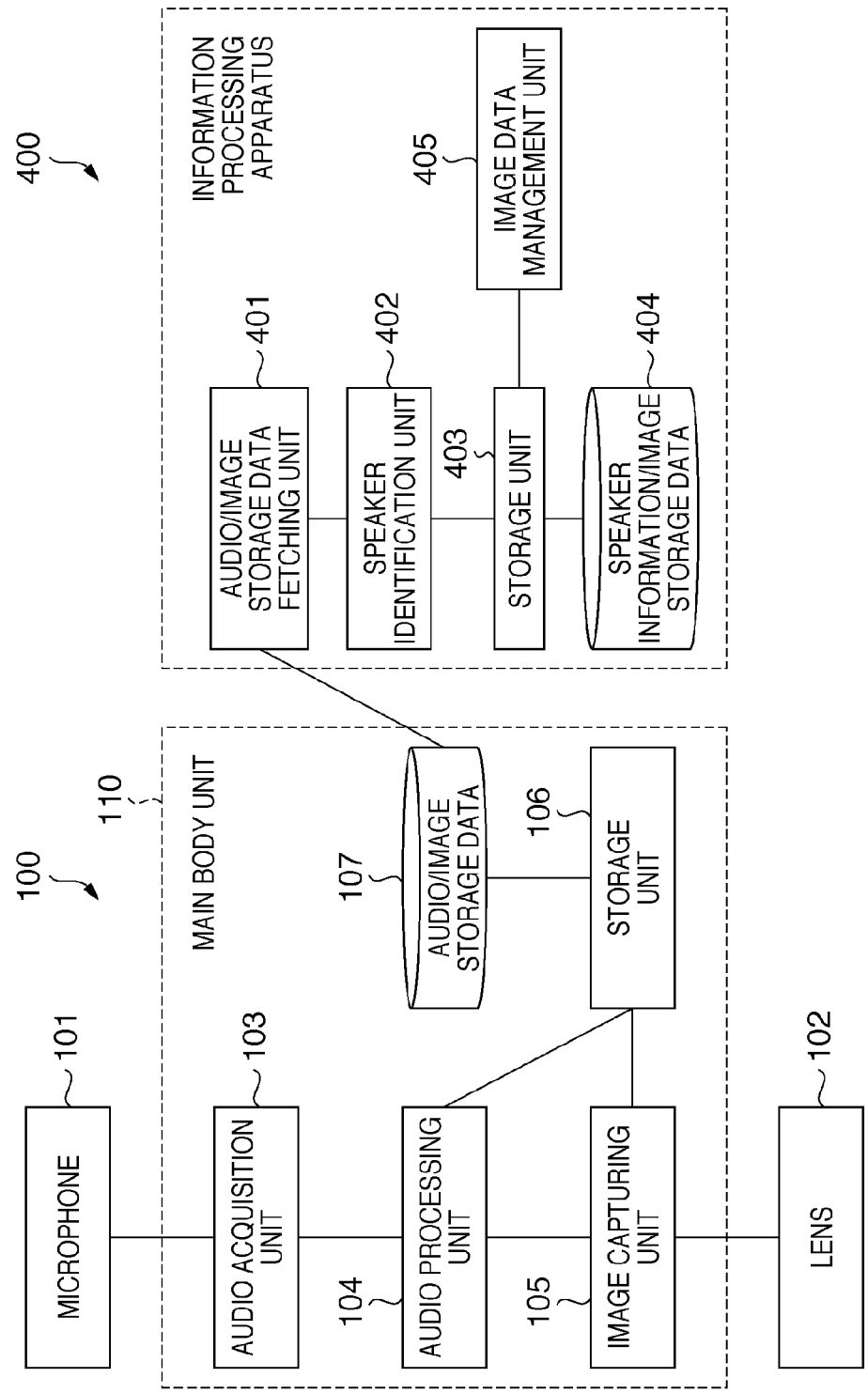
FIG. 4 is a block diagram showing a state in which an information processing apparatus 400 that can be connected to the image capturing apparatus 100 to allow communications is connected to that image capturing apparatus 100.

FIG. 4 is a block diagram showing a state in which an information processing apparatus 400 that can be connected to the image capturing apparatus 100 to allow communications is connected to the image capturing apparatus 100. The functional arrangement of the information processing apparatus 400 will be described below with reference to FIG. 4. Note that the image capturing apparatus 100 in FIG. 4 has already been described in the first embodiment, and a repetitive description thereof will be avoided.

In the information processing apparatus 400, an audio/image storage data fetching unit 401 fetches all image data including the audio/image storage data 107 stored in the storage unit 106 of the image capturing apparatus 100. A speaker identification unit 402 executes speaker identification of audio data included in the audio/image storage data 107 fetched by the audio/image storage data fetching unit 401, and extracts speaker information. Note that a speaker identification technique is a state-of-the-art technique, and a description thereof will not be given.

A storage unit 403 stores the extracted speaker information in association with image data included in the audio/image storage data 107 fetched by the audio/image storage data fetching unit 401 as speaker information/image storage data 404.

An image data management unit 405 manages the speaker information/image storage data 404 stored in the storage unit 403.

<2. Sequence of Processing in Information Processing Apparatus>

Figure 5:
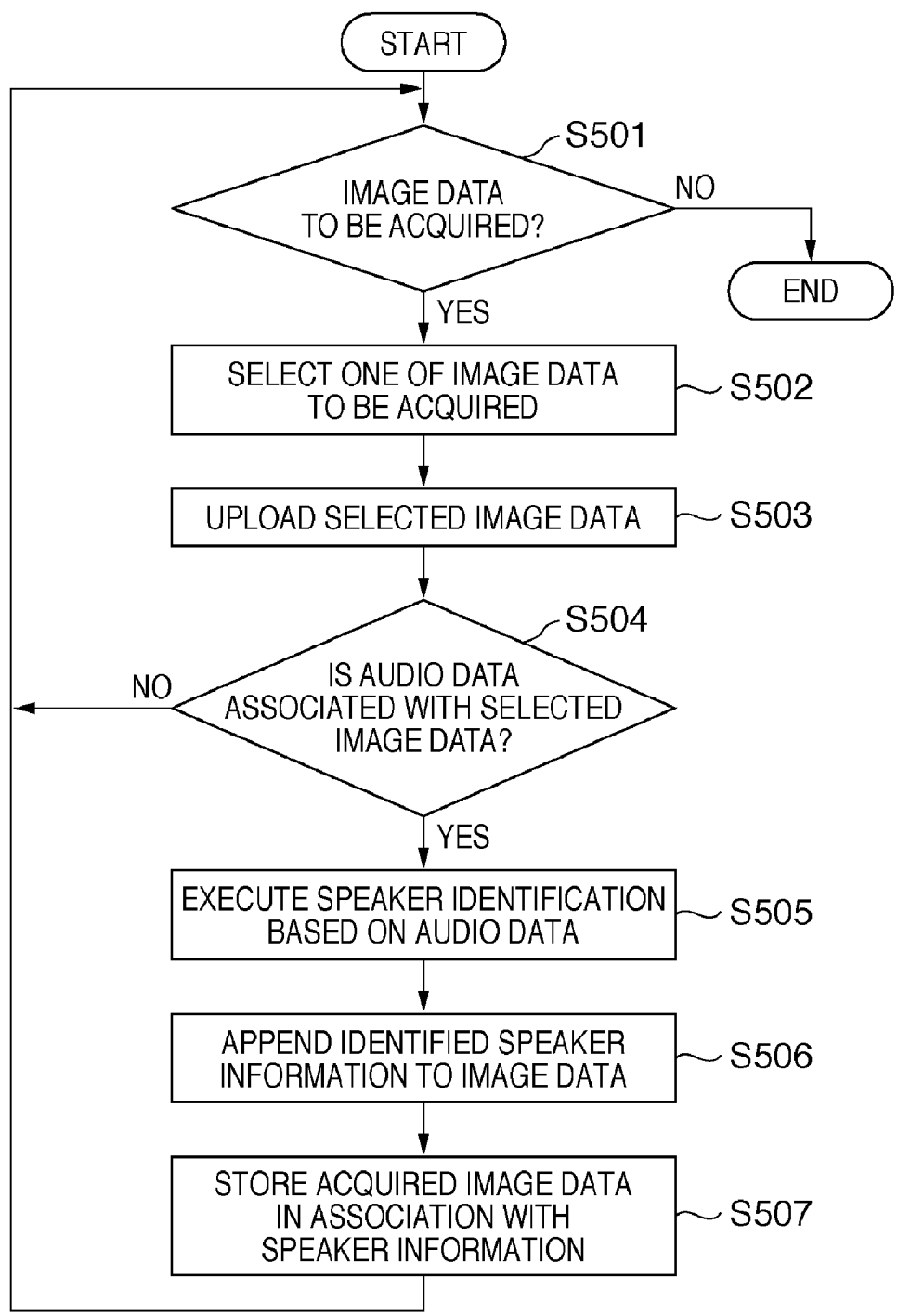
FIG. 5 is a flowchart showing the sequence of processing in the information processing apparatus 400 to which image data captured by the image capturing apparatus 100 are uploaded together with audio data.

FIG. 5 is a flowchart showing the sequence of processing in the information processing apparatus 400 to which image data captured by the image capturing apparatus 100 are uploaded together with audio data.

The flowchart shown in FIG. 5 is executed when image data are uploaded from the image capturing apparatus 100 to the information processing apparatus (for example, the processing starts when the image capturing apparatus 100 and information processing apparatus 400 are connected via a USB cable).

It is checked in step S501 if the image capturing apparatus 100 stores image data to be acquired by the information processing apparatus 400. If it is determined that no image data to be acquired is stored, it is determined that the image capturing apparatus 100 stores no new data, thus ending the processing.

On the other hand, if it is determined in step S501 that image data to be acquired are stored, the process advances to step S502 to select one of the image data to be acquired.

In step S503, the selected image data is uploaded. It is checked in step S504 if the uploaded image data is the audio/image storage data 107, and associated audio data is included.

If it is determined in step S504 that no associated audio data is included, the process returns to step S501 to repeat the processes in steps S501 to S503, thereby uploading another image data to be acquired.

On the other hand, if it is determined in step S504 that the associated audio data is included, the process advances to step S505 to analyze that audio data. With this analysis, the audio data indicating a predetermined command (an audio shutter command including a character string "Say cheese!" or the like) is detected, and speaker identification is executed based on the detected audio data.

As has been described in the first embodiment, the audio data stored in association with image data is that after the voice shutter mode is started until audio data indicating the audio shutter command is detected. For this reason, this audio data may include an audio uttered by a person other than a photographer. Hence, before execution of the speaker identification, audio data indicating the audio shutter command is detected first, and the speaker identification is executed based on the detected audio data.

The description will revert to FIG. 5. In step S506, speaker information identified as a result of the speaker identification in step S505 is appended to the image data included in the uploaded audio/image storage data 107.

In step S507, the storage unit 403 stores the image data appended with the speaker information in step S506.

As a result, when the audio/image storage data 107 captured in the voice shutter mode is uploaded to the information processing apparatus 400, the speaker information associated with the photographer who uttered the audio shutter command can be appended to that image data. Then, these data can be stored as the speaker information/image storage data 404.

<3. Example of Speaker Information/Image Storage Data>

Figures 6, 7:
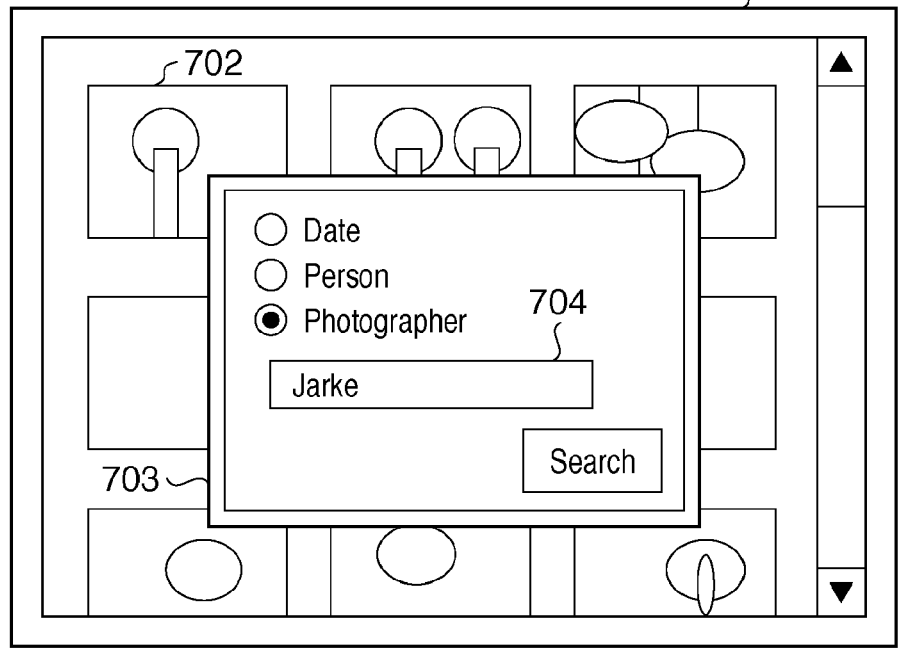
FIG. 6 is a table showing an example of speaker information/image storage data 404.
FIG. 7 is a view showing an example of a user interface 701 displayed upon execution of a management function of an image data management unit 405.

FIG. 6 shows an example of the speaker information/image storage data 404. As shown in FIG. 6, speaker information 601 and image data 602 included in the uploaded audio/image storage data 107 are stored in association with each other.

Note that the information processing apparatus 400 can effectively use the speaker information associated with the image data in this way upon managing image data.

<4. Management Function of Image Data Management Unit>

FIG. 7 shows an example of a user interface 701 displayed upon execution of the management function of the image data management unit 405.

The image data management unit 405 can display an image data group 702 previously uploaded from the image capturing apparatus 100 as a list. When the user presses a search button (not shown), an image search dialog box 703 is displayed.

Using the image search dialog box 703, image data can be retrieved using annotation data appended to the image data. For example, when the user selects "Photographer" on the image search dialog box 703 and inputs a photographer name in photographer information input area 704, image data, with which that photographer name is associated as speaker identification information, can be retrieved.

As can be apparent from the above description, the information processing apparatus according to this embodiment is configured to execute speaker identification upon uploading image data with which audio data is associated, and to store speaker information in association with the image data. In this manner, speaker information associated with a photographer can be automatically appended to image data, thus allowing effective use of audio data.

Third Embodiment

The second embodiment has explained the case in which speaker identification is executed as various kinds of processing in the information processing apparatus to which image data captured by the image capturing apparatus are uploaded together with audio data. However, the present invention is not limited to such specific processing.

For example, the information processing apparatus may be configured to output associated audio data together upon displaying uploaded image data as a slideshow.

<1. Functional Arrangement of Information Processing Apparatus>

Figure 8:
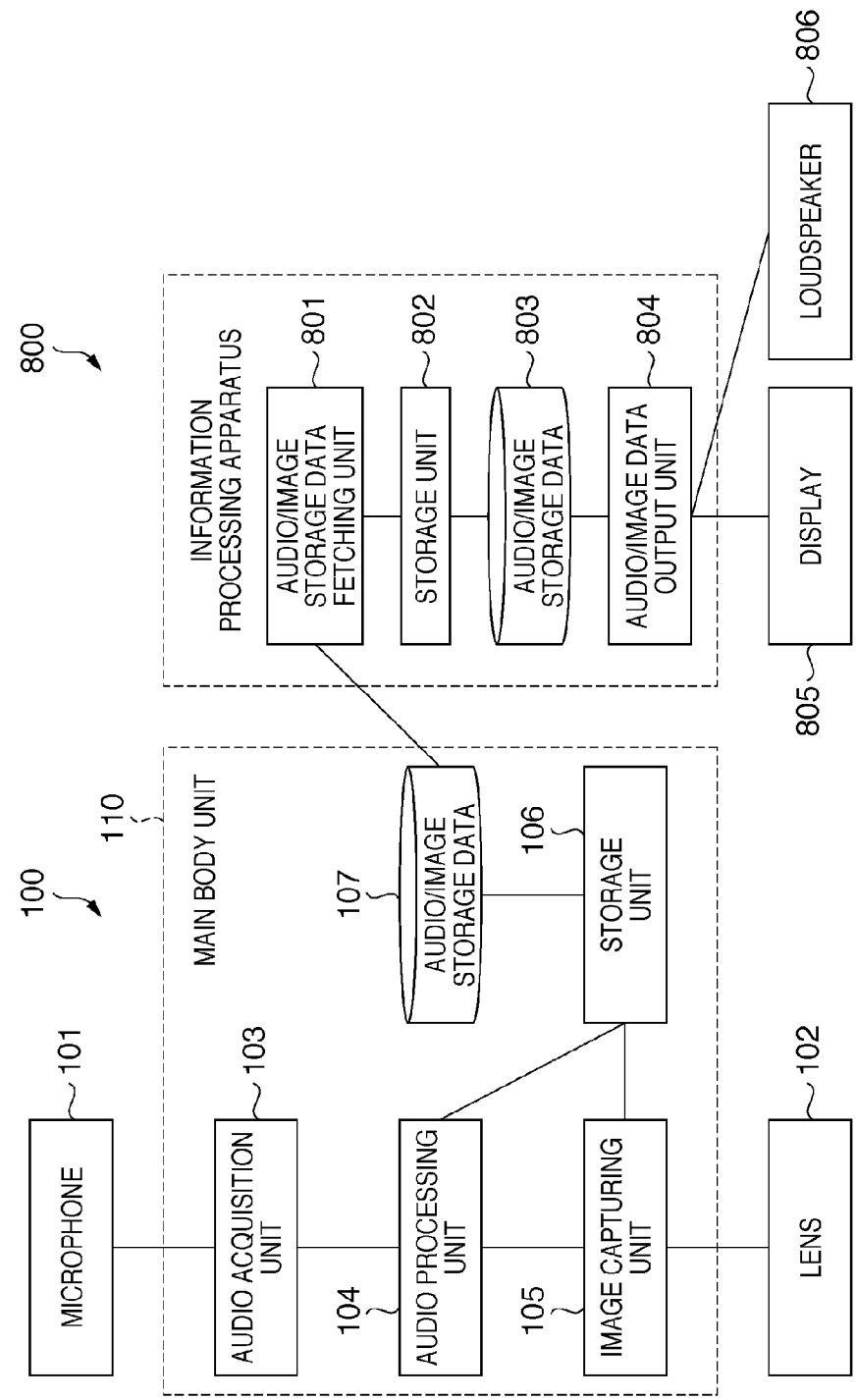
FIG. 8 is a block diagram showing a state in which an information processing apparatus 800 that can be connected to the image capturing apparatus 100 to allow communications is connected to that image capturing apparatus 100.

FIG. 8 is a block diagram showing a state in which an information processing apparatus 800 that can be connected to the image capturing apparatus 100 to allow communications is connected to the image capturing apparatus 100. The functional arrangement of the information processing apparatus 800 will be described below with reference to FIG. 8. Note that the image capturing apparatus 100 in FIG. 8 has already been described in the first embodiment, and a repetitive description thereof will be avoided.

In the information processing apparatus 800, an audio/image storage data fetching unit 801 fetches audio/image storage data 107 stored in the storage unit 106 of the image capturing apparatus 100. Assume that the fetching processing of the audio/image storage data 107 is started in response to connection of the image capturing apparatus 100 and information processing apparatus 800 via a USB cable as a trigger. A storage unit 802 stores the fetched audio/image storage data 107 as audio/image storage data 803.

An audio/image data output unit 804 outputs the contents of all image data including the audio/image storage data 803 stored in the storage unit 802 to an external display 805 and loudspeaker 806 when the user inputs a slideshow start instruction.

<2. Sequence of Processing in Information Processing Apparatus>

Figure 9:
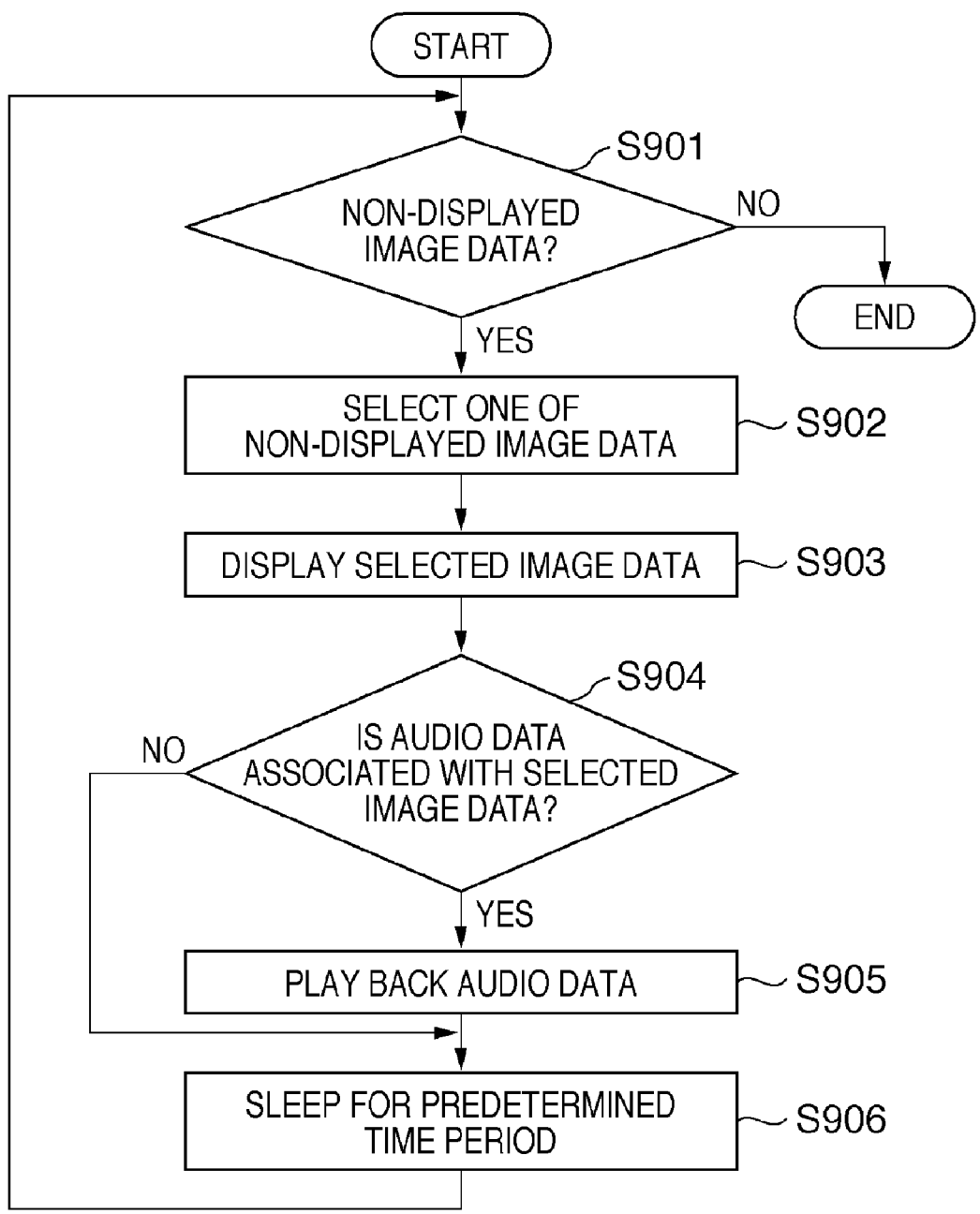
FIG. 9 is a flowchart showing the sequence of processing in an audio/image data output unit 804 when the user inputs a slideshow start instruction.

FIG. 9 is a flowchart showing the sequence of processing in the audio/image data output unit 804 when the user inputs a slideshow start instruction. Note that the user can input the slideshow start instruction by, for example, pressing a slideshow button on a remote controller.

It is confirmed in step S901 if non-displayed image data remain. Note that the non-displayed image data are those which have never been displayed after the beginning of the processing of the audio/image data output unit 804.

If it is determined that all image data have already been displayed in step S901, the processing ends. On the other hand, if it is determined that non-displayed image data remain, one of the non-displayed image data is selected in step S902. In step S903, the image data selected in step S902 is displayed on the display 805.

After the selected image data is displayed on the display 805, it is confirmed in step S904 if the selected image data is the audio/image storage data 803, and audio data is associated with the image data.

If it is determined in step S904 that the audio data is not associated, the process advances to step S906. On the other hand, if it is determined in step S904 that the audio data is associated, the process advances to step S905 to output the audio data associated with the image data while the image data is displayed on the display 805.

Upon completion of display of the image data, and output of the audio data, the process advances to step S906 to sleep processing for a predetermined period of time (e.g., 5 sec). After that, the process returns to step S901 to confirm if non-displayed image data still remain.

In this way, in the information processing apparatus of this embodiment, a user's utterance upon activating the shutter in the voice shutter mode can be output simultaneously with display of image data during execution of a slideshow. More specifically, image data can be displayed while outputting audio data such as "Say cheese!", "Smile!", or the like uttered by the photographer. As a result, the user can experience a sense of reality at the time of image capturing when a slideshow is executed.

Fourth Embodiment

As various kinds of processing in the information processing apparatus to which image data captured by the image capturing apparatus are uploaded together with audio data, speaker identification is executed in the second embodiment, and a slideshow is executed in the third embodiment, as described above. However, the present invention is not limited to such specific processes, and these processes may be executed in combination.

In such case, the audio/image storage data 803 described in the third embodiment includes information of the speaker information/image storage data 404 described in the second embodiment. More specifically, image data, audio data (voice memo), and speaker information are stored in association with each other.

With this configuration, for example, image data is displayed on the display 805, audio data is output via the loudspeaker 806, and speaker information corresponding to the audio data can be displayed on the display 805, upon execution of a slideshow.

Figure 10:
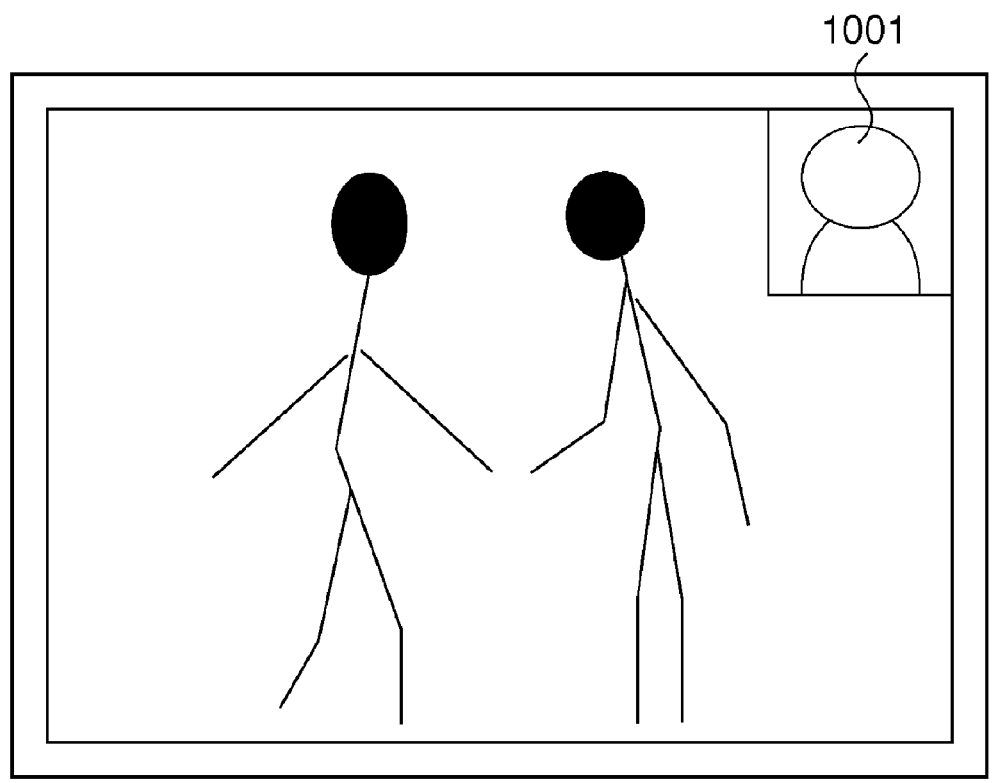
FIG. 10 is a view showing an example of a slideshow executed by the information processing apparatus 800.

FIG. 10 shows an example of a slideshow executed by the information processing apparatus according to this embodiment.

The audio/image data output unit 804 automatically displays image data stored in the storage unit 802, and when speaker information is associated with the image data which is being displayed, the unit 804 can display an icon 1001 indicating a photographer specified by that speaker information. An icon corresponding to speaker information is determined in advance to allow such display.

As described above, in the information processing apparatus according to this embodiment, an utterance of the photographer upon activating the shutter in the voice shutter mode can be played back simultaneously with display of image data, and information associated with the uttered photographer can be displayed, during execution of the slideshow.

Fifth Embodiment

In the configuration of the first embodiment, all audio data fetched from when the voice shutter mode starts until audio data indicating a predetermined command is detected are stored in association with image data. However, the present invention is not limited to this, and at least some of the fetched audio data may be stored in association with image data. In the fifth and sixth embodiments to be described hereinafter, processing in an image capturing apparatus will be explained again.

Figure 11:
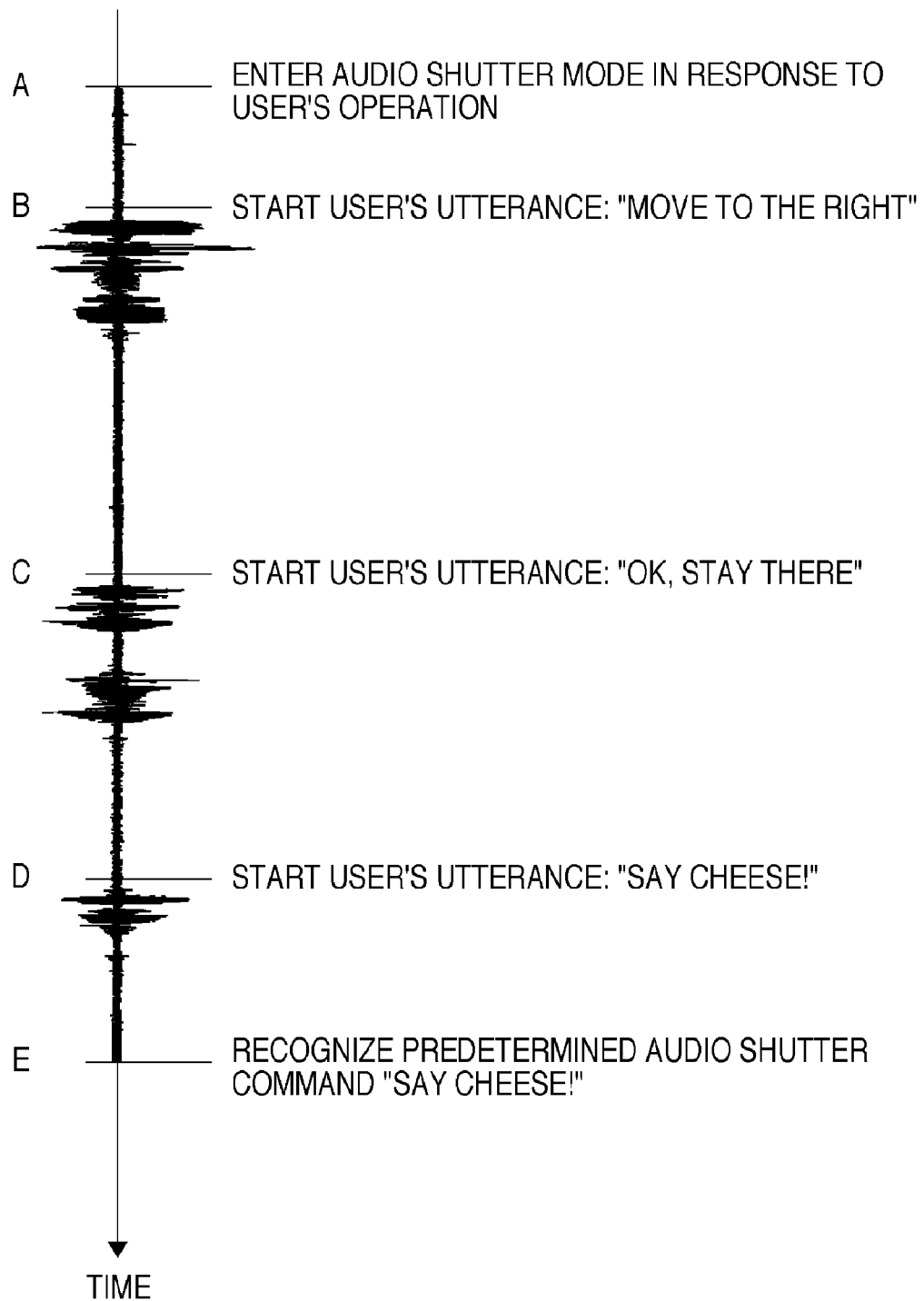
FIG. 11 is a view showing audio data in time series fetched from when a voice shutter mode starts until audio data indicating a predetermined command is detected.

FIG. 11 is a view showing, in time series, audio data fetched from when the voice shutter mode starts until audio data indicating a predetermined command is detected.

In the first embodiment, audio data fetched during a period from time A to time E in FIG. 11 are stored in association with captured image data. By contrast, in this embodiment, only audio data during a period from utterance start time D of "Say cheese!" as a predetermined audio shutter command to time E of recognition of that command is left. Other audio data (those from time A to time D) are discarded. In this way, utterances other than the predetermined shutter command such as "Move to the right" and "OK, stay there", which are not related to the audio shutter command, can be excluded from audio data to be stored.

Note that audio data to be discarded are not limited to these. Conversely, audio data during a period from time D to time E may be discarded, and only audio data during a period from time A to time D may be stored. As a result, only audio data other than that indicating a predetermined command such as "Move to the right" and "OK, stay there" can be stored. Upon playing back audio data stored in this manner in a slideshow, audio data ("Move to the right" and "OK, stay there" in the above example) other than that indicating a predetermined command "Say cheese!" can be output. As a result, the user's interest will not wear out.

Sixth Embodiment

In the first embodiment, the user sets the voice shutter mode by directly operating the image capturing apparatus.

However, the present invention is not limited to this. For example, the user may set the voice shutter mode via a remote controller.

In the first embodiment, when the speech processing unit determines that an audio shutter command is detected, the image capturing unit immediately executes image capturing processing. However, the present invention is not limited to this. For example, the execution timing of the image capturing processing by the image capturing unit may be changed in accordance with the contents of a detected audio shutter command. Alternatively, a range on the time axis to be fetched as audio data may be changed in accordance with the contents of a detected audio shutter command. Details of this embodiment will be described below.

<1. Functional Arrangement of Image Capturing Apparatus>

Figure 12:
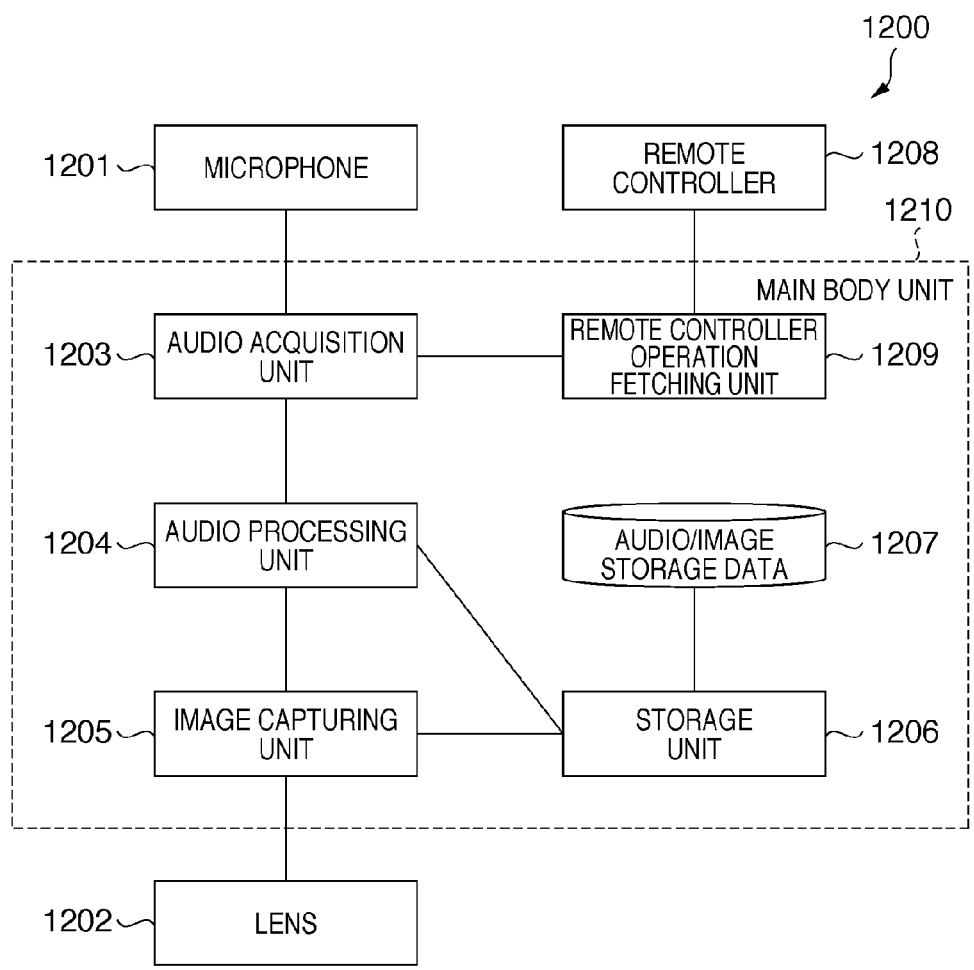
FIG. 12 is a block diagram showing the functional arrangement of an image capturing apparatus according to the sixth embodiment of the present invention.

FIG. 12 is a block diagram showing the functional arrangement of an image capturing apparatus according to the sixth embodiment of the present invention. An image capturing apparatus 1200 is an image capturing apparatus such as a digital camera or the like, which captures images of a landscape, person, and the like in response to a user's operation or voice command.

The image capturing apparatus 1200 is configured to allow wireless connection of a remote controller 1208. A wireless signal transmitted from the remote controller 1208 is fetched into a main body unit 1210 via a remote controller operation fetching unit 1209.

With this arrangement, the user can operate the image capturing apparatus 1200 by operating the remote controller 1208. For example, the user can change a mode of the main body unit 1210 to a voice shutter mode from a remote place by operating the remote controller 1208.

A microphone 1201 is connected to the main body unit 1210 of the image capturing apparatus 1200, and fetches a user's utterance as audio data into the main body unit 1210 via an audio acquisition unit 1203. The fetched audio data is sent to an audio processing unit 1204.

The audio processing unit 1204 sends the fetched audio data to a storage unit 1206, and analyzes the fetched audio data using a speech recognition technique as a state-of-the-art technique.

When the audio processing unit 1204 detects audio data indicating a predetermined command (for example, an audio shutter command including a character string "Say cheese!" or the like) as a result of analysis, it notifies an image capturing unit 1205 of the audio shutter command.

Upon notification of the audio shutter command by the audio processing unit 1204, the image capturing unit (image capturing control unit) 1205 captures an object image by activating a shutter and taking in externally incoming light via a lens 1202, thus acquiring image data.

The image data captured by the image capturing unit 1205 is sent to the storage unit 1206. The storage unit (storage control unit) 1206 associates the previously received audio data with the image data, and stores them as audio/image storage data 1207.

<2. Sequence of Processing in Voice Shutter Mode in Image Capturing Apparatus>

Figure 13:
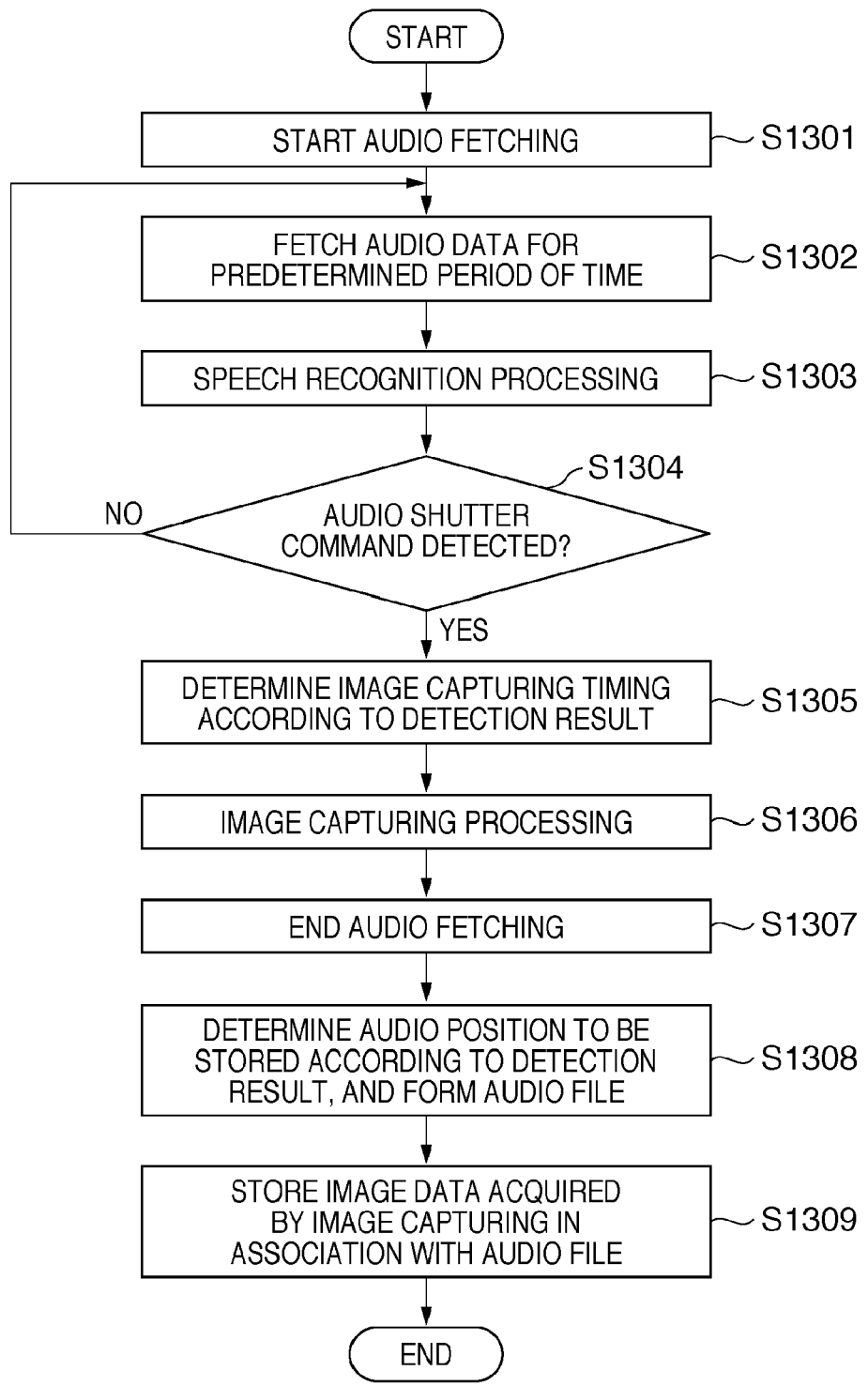
FIG. 13 is a flowchart showing the sequence of processing in a voice shutter mode of an image capturing apparatus 1200.

FIG. 13 is a flowchart showing the sequence of processing in the voice shutter mode of the image capturing apparatus 1200.

When the user makes an operation for changing a mode to the voice shutter mode on the remote controller 1208, the processing shown in the flowchart of FIG. 13 starts.

Upon starting the voice shutter mode, the audio acquisition unit 1203 begins to acquire audio data sent from the microphone 1201 in step S1301.

In step S1302, count-up for a predetermined time period (e.g., about 0.1 sec) is started. In this way, audio data sent from the microphone 1201 is fetched for the predetermined time period.

In step S1303, the audio processing unit 1204 analyzes, using the speech recognition technique, the audio data fetched by the audio acquisition unit 1203.

It is checked in step S1304 as a result of analysis of the audio processing unit 1204 if an audio shutter command is detected. As a result of checking in step S1304, if it is determined that no audio shutter command is detected, the process returns to step S1302 to repeat the processes in steps S1302 to S1304 again.

On the other hand, if it is determined that an audio shutter command is detected, the process advances to step S1305 to determine an image capturing timing according to a user's utterance format in the detected audio shutter command.

Figures 14, 15:
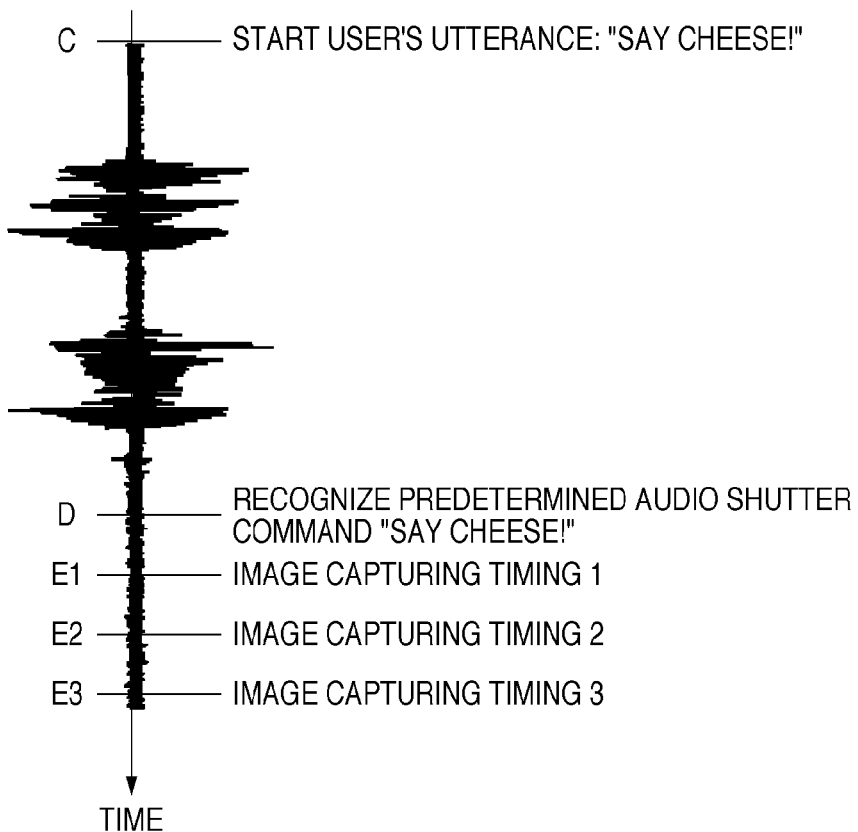
FIG. 14 is a view showing an example of an utterance duration/image capturing timing table 1401 used upon determining an image capturing timing in accordance with an utterance duration.
FIG. 15 is a view showing a state in which an image capturing unit 1205 executes image capturing processing at an image capturing timing determined based on the utterance duration/image capturing timing table 1401.

Note that the user's utterance format is defined as information other than linguistic information included in an utterance. For example, an utterance duration (a duration from the start to end of an utterance) or the like is one of the utterance formats. FIG. 14 shows an example of an utterance duration/image capturing timing table 1401 used upon determining the image capturing timing in accordance with an utterance duration.

As shown in FIG. 14, when the utterance duration of the audio shutter command "Say cheese!" is less than 0.5 sec, the image capturing processing starts 0.4 sec after recognition of the audio shutter command. Likewise, when the utterance duration of the audio shutter command falls within the range from 0.5 sec (inclusive) to 1 sec (exclusive), the image capturing processing starts 0.6 sec after recognition of the audio shutter command. Also, when the utterance duration of the audio shutter command is 1 sec or more, the image capturing processing starts 0.8 sec after recognition of the audio shutter command.

That is, when the duration from the start to end of an utterance of an audio shutter command is m sec, the image capturing processing starts M sec after recognition of the audio shutter command. When the duration is n sec (m>n), the image capturing processing starts N sec (M>N) after recognition of the audio shutter command.

With this setting, when the user purposely utters an audio shutter command like "Say, cheeeeeese!" slowly, the image capturing processing starts a given period of time after speech recognition. In this way, the image capturing timing can be controlled in accordance with user's intention. For example, when the user wants to set a silent state after the end of utterance until image capturing, he or she can utter "Say, cheeeeeese!" to achieve this.

Note that numerical values shown in FIG. 14 are examples, and other values may be set. For example, 0.5 sec and 1 sec are used as thresholds of utterance durations in FIG. 14, but these thresholds may be changed to 1 sec and 2 sec.

In FIG. 14, three classifications are set with reference to the utterance durations, but the present invention is not limited to this. For example, a case of the utterance duration of 1 sec or more may be further divided into a plurality of classifications. In this case, four or more classifications are set (corresponding to descriptions "..." in FIG. 14). The utterance format is not limited to the utterance duration, but may be the pitch, loudness, and the like of a voice. For example, upon making the above description using the voice pitch instead, three classified tone pitches are associated with the image capturing timings (0.4 sec, 0.6 sec, and 0.8 sec in FIG. 14). Then, one of the three image capturing timings is selected based on the voice pitch of an audio shutter command uttered by the user at the time of image capturing.

The description will revert to FIG. 13. In step S1306, the image capturing unit 1205 executes the image capturing processing based on the image capturing timing determined in step S1305.

FIG. 15 shows a state in which the image capturing unit 1205 executes the image capturing processing at the image capturing timing determined based on the utterance duration/image capturing timing table 1401 shown in FIG. 14. In FIG. 15, the ordinate is the time axis, and the sequence from when the audio shutter command is detected until the image capturing processing is executed is illustrated in time series.

As shown in FIG. 15, assume that the user begins to utter "Say cheese!" at time C, and the image capturing apparatus 1200 recognizes an audio shutter command "Say cheese!" at time D. In this case, actual image capturing processing is executed after time D and at one of timings of times E1, E2, and E3. At this time, at which of timings the image capturing processing is executed is determined based on the utterance duration/image capturing timing table 1401 or the like depending on the user's utterance format.

The description will revert to FIG. 13. In step S1307, fetching of audio data ends. Note that fetching of audio data may end immediately after completion of the image capturing processing in step S1306 or after an elapse of a predetermined period of time (e.g., 5 sec after completion of the image capturing processing).

In step S1308, the position of audio data to be stored is determined according to the contents of audio data recognized by the audio processing unit 1204 in step S1303. Furthermore, the audio data at the determined position is converted into a file.

Figure 16:
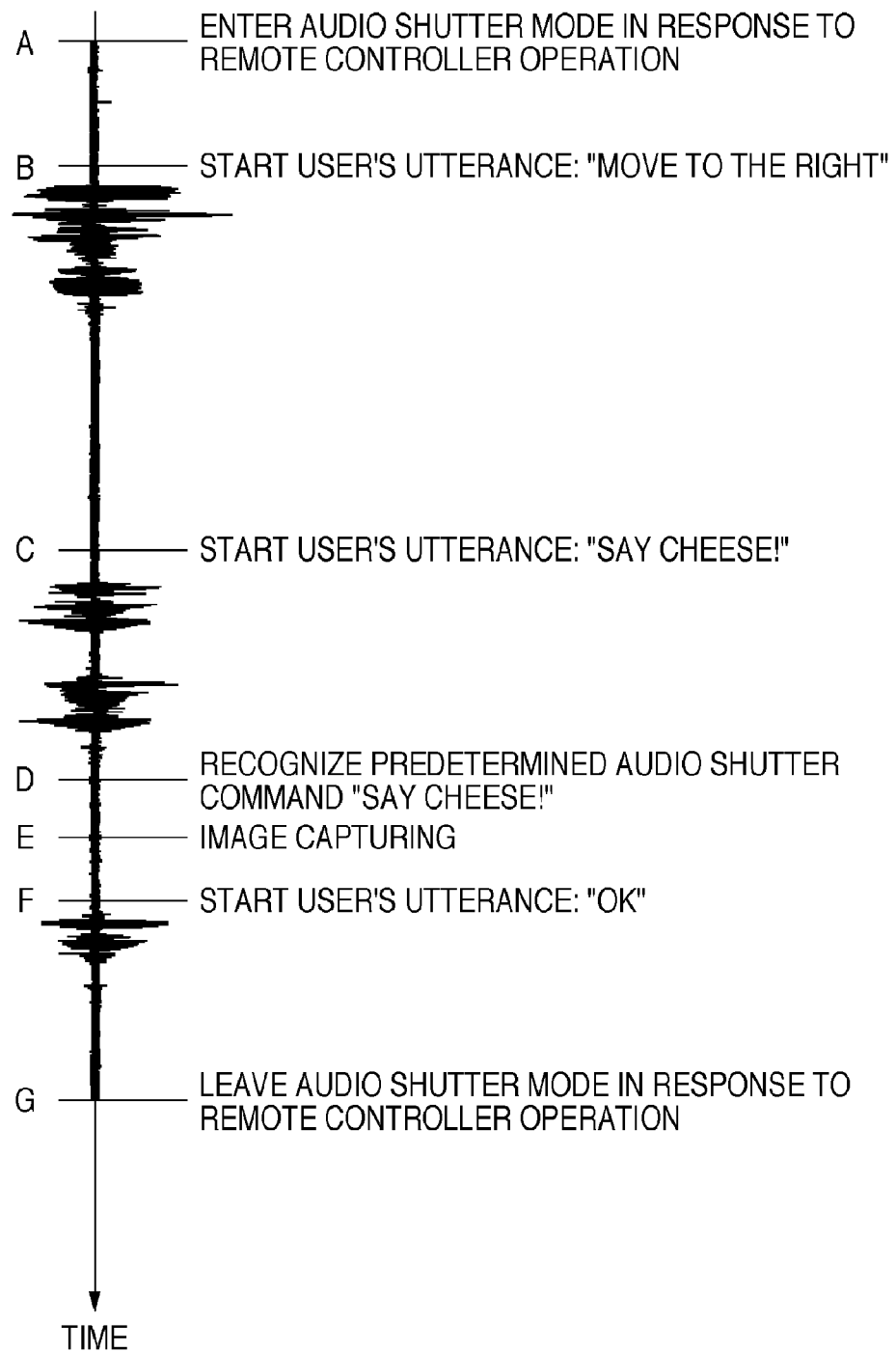
FIG. 16 is a view for explaining processing for determining a position of audio data to be stored in accordance with the contents of audio data recognized by audio processing unit 1204.

FIG. 16 is a view for explaining processing for determining the position of audio data to be stored in accordance with the contents of audio data recognized by the audio processing unit 1204. In FIG. 16, the ordinates is the time axis, and audio data fetched during a period from when the voice shutter mode starts until audio data indicating a predetermined command is detected are listed in time series.

In FIG. 16, time A indicates a timing at which the user operated the remote controller 1208 to start the voice shutter mode. Time B indicates a timing (utterance timing) at which the user began to utter "Move to the right" as an utterance, which is not registered in the apparatus as an audio shutter command. Time C indicates a timing at which the user began to utter "Say cheese!", which is registered in the apparatus as an audio shutter command. Time D indicates a timing at which the image capturing apparatus 1200 recognized the audio shutter command. Time E indicates a timing at which the image capturing apparatus 1200 executed the image capturing processing. Time F indicates a timing at which the user began to utter "OK" after completion of the image capturing processing, which is registered in the apparatus as an audio shutter command. Furthermore, time G indicates a timing at which the user operated the remote controller 1208 to change the voice shutter mode to another mode.

The image capturing apparatus 1200 determines a position of audio data of those shown in FIG. 16, which is to be converted into a file, depending on the types of audio data recognized by the apparatus. That is, the position on the time axis to be converted into a file as a voice memo is determined according to which of a plurality of audio shutter commands registered in the apparatus the input audio shutter command corresponds. That is, the audio shutter command described in FIG. 16 is "Say cheese!". However, when a command ("Smile!" or the like) other than this command is input, the position on the time axis to be converted into a file as a voice memo is different. An example will be described below.

For example, when the recognized audio shutter command is "Say cheese!" (first voice command), only that audio data part (audio data during the period from time C to time D in FIG. 16) is converted into a file. When the recognized audio shutter command is "Smile!" (second voice command), audio data during a period from when the voice shutter mode starts until the user begins to utter an audio shutter command (audio data during the period from time A to time C in FIG. 16) is to be converted into a file. When another audio shutter command (third voice command) is recognized, audio data after completion of the image capturing processing until the user switches the voice shutter mode to another mode (audio data during the period from time E to time G in FIG. 16) is converted into a file. In this way, when the user changes an audio shutter command to be uttered on purpose, a time band of a voice memo to be appended to a captured image can be selected. Note that three different audio shutter commands are used in this case ("Say cheese!", "Smile!", and another audio shutter command). However, the present invention is not limited to these specific commands. For example, "another audio shutter command" may be further segmented.

For example, "3, 2, 1 (words indicating count-down)" (fourth voice command) is registered as an audio shutter command. When the apparatus recognizes this audio shutter command, it is also effective to convert, into a file, audio data input "immediately after utterance of this command is completed (immediately after this command is recognized)" "until the user switches the voice shutter mode to another mode". That is, it is also effective to convert, into a file, audio data during the period from time D to time G in FIG. 16 in place of after completion of image capturing.

In order to implement the processing in step S1308, audio data from when the voice shutter mode starts until another mode starts need to be kept held in a memory or temporary file. In this way, at the time of recognition of an audio shutter command, at which position on the time axis audio data is to be stored (this audio data is not always an audio shutter command) is determined, and the selected audio data can be converted into a file as a voice memo.

The description will revert to FIG. 13. After the audio data at the determined position is converted into a file in step S1308, the audio data file is stored in the storage unit 1206 in association with image data acquired by the image capturing processing in step S1309. Since the storage method in the storage unit 1206 has already been explained using FIG. 3 in the first embodiment, a detailed description thereof will not be given.

As can be apparent from the above description, according to this embodiment, a user's utterance in a time band relatively close to the shutter activation timing in the voice shutter mode can be fetched as audio data, and can be stored in association with captured image data. In this case, the user can make an operation using the remote controller.

Particularly, in this embodiment, the execution timing of the image capturing processing can be changed according to the contents of an audio shutter command. In this manner, the user can control the image capturing timing depending on the utterance of an audio shutter command. Furthermore, the user can control the range on the time axis to be appended (converted into a file) to a captured image as audio data (voice memo) in accordance with the contents of an audio shutter command.

It is more effective to use these two features (the image capturing timing control technique and control of a voice memo target time period) in combination.

For example, a case will be examined below wherein audio data after time D is to be recorded using the aforementioned audio shutter command "3, 2, 1". If the user utters this "3, 2, 1" over about 2 sec (corresponding to an utterance of 1 sec or more in FIG. 14), the time period from time D to time E to be recorded as a command voice memo can be prolonged. In this way, audio data immediately before image capturing other than a photographer can be recorded while excluding the audio shutter command of the photographer from recording. In addition, by combining the aforementioned two features, various methods of use are available.

Seventh Embodiment

Audio data to be stored in the first to sixth embodiments may undergo noise reduction processing based on a known noise reduction technique in the image capturing apparatus or information processing apparatus. In this way, clear audio data free from any noise can be played back at the time of a slideshow.

If only noise components can be extracted, only these noise components may be saved. For example, noise components (environmental sound) such as the sound of a stream, sound of a birdsong, and the like are left, thus outputting environmental sound upon image capturing at the time of a slideshow.

Other Embodiments

Note that the present invention may be applied to either a system constituted by a plurality of devices (e.g., a host computer, interface device, reader, printer, and the like), or an apparatus consisting of a single piece of equipment (e.g., a copying machine, facsimile apparatus, or the like).

The objects of the present invention are also achieved when a computer-readable storage medium that stores a program code of software required to implement the functions of the aforementioned embodiments is supplied to a system or apparatus. In this case, the functions are implemented when a computer (or a CPU or MPU) of that system or apparatus reads out and executes the program code stored in a storage medium. In this case, the storage medium that records the program code constitutes the present invention.

As the storage medium used to supply the program code, for example, a floppy disk, hard disk, optical disk, magneto-optical disk, CD-ROM, CD-R, magnetic tape, nonvolatile memory card, ROM, and the like can be used.

The present invention is not limited to a case in which the functions of the aforementioned embodiments are implemented when the computer executes the readout program code. For example, the present invention also includes a case in which an OS (operating system) running on the computer executes some or all of actual processes based on instructions of the program code, thereby implementing the functions of the aforementioned embodiments.

Furthermore, the present invention also includes a case in which the functions of the aforementioned embodiments are implemented after the program code read out from the storage medium is written in a memory equipped on a function expansion board or function expansion unit, which is inserted into or connected to the computer. That is, the present invention also includes a case in which after the program code is written in the memory, a CPU equipped on the function expansion board or unit executes some or all of actual processes based on an instruction of the program code, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-278054 filed on Oct. 25, 2007, No. 2008-171241 filed on Jun. 30, 2008, and No. 2008-202423 filed on Aug. 5, 2008 those are hereby incorporated by reference herein in their entirety.

What is claimed is:

1. An image capturing apparatus comprising:
   an audio acquisition unit configured to acquire audio data;
   a detection unit configured to detect a voice command included in the audio data;
   a processor configured to execute at least one computer program, the at least one computer program comprising program code that when executed by the processor implements:
      an image capturing control unit configured to acquire image data by controlling an image capturing unit to capture an object image when the voice command is detected; and
      a storage control unit configured to control a storage unit to store at least one of the audio data which have predetermined time relationships with an utterance timing of the voice command as a voice memo in association with the acquired image data,
   wherein, when a duration of time from the start to end of utterance of the voice command is m seconds, the image capturing control unit controls the image capturing unit to capture an object image M seconds after recognition of the voice command, and when the duration of time from the start to end of utterance of the voice command is n seconds (m>n), the image capturing control unit controls the image capturing unit to capture an object image N seconds (M>N) after recognition of the voice command.

2. The apparatus according to claim 1, wherein the storage control unit determines to select at least one of the audio data having the predetermined time relationships in accordance with a type of the detected voice command.

3. The apparatus according to claim 2, wherein when a first voice command is detected, the storage control unit controls the storage unit to store, as a first voice memo, audio data acquired by the audio acquisition unit during a period from start to end of utterance of the first voice command in association with the acquired image data.

4. The apparatus according to claim 2, wherein when a second voice command is detected, the storage control unit controls the storage unit to store, as a second voice memo, audio data acquired by the audio acquisition unit during a period from a pre-set time until start of utterance of the second voice command in association with the acquired image data.

5. The apparatus according to claim 2, wherein when a third voice command is detected, the storage control unit controls the storage unit to store, as a third voice memo, audio data acquired by the audio acquisition unit during a period from end of utterance of the third voice command until a pre-set time in association with the acquired image data.

6. The apparatus according to claim 2, wherein when a fourth voice command is detected, the storage control unit controls the storage unit to store, as a fourth voice memo, audio data acquired by the audio acquisition unit during a period from when the object image is captured until a pre-set time in association with the acquired image data.

7. An image capturing apparatus comprising:
   an audio acquisition unit configured to acquire audio data;

a detection unit configured to detect a voice command included in the audio data;

a processor configured to execute at least one computer program, the at least one computer program comprising program code that when executed by the processor implements:

an image capturing control unit configured to acquire image data by controlling an image capturing unit to capture an object image when the voice command is detected; and a storage control unit configured to control a storage unit to store at least one of the audio data which have predetermined time relationships with an utterance timing of the voice command as a voice memo in association with the acquired image data, wherein, when a duration of time from the start to end of utterance of the voice command is m seconds, the image capturing control unit controls the image capturing unit to capture an object image M seconds after recognition of the voice command, and when the duration of time from the start to end of utterance of the voice command is n seconds (m>n), the image capturing control unit controls the image capturing unit to capture an object image N seconds (M>N) after recognition of the voice command, and wherein the storage control unit determines to select at least one of the audio data having the predetermined time relationships in accordance with a type of the detected voice command.

8. A method for information processing in an image capturing apparatus, the method comprising:

acquiring audio data;

detecting a voice command included in the audio data;

acquiring image data by controlling an image capturing unit to capture an object image when the voice command is detected; and controlling a storage unit to store at least one of the audio data which have predetermined time relationships with an utterance timing of the voice command as a voice memo in association with the acquired image data, wherein, when a duration of time from the start to end of utterance of the voice command is m seconds, the image capturing unit is controlled to capture an object image M seconds after recognition of the voice command, and when the duration of time from the start to end of utterance of the voice command is n seconds (m>n), the image capturing control unit is controlled to capture an object image N seconds (M>N) after recognition of the voice command.

9. An information processing method in an image capturing apparatus, comprising:

acquiring audio data;

detecting a voice command included in the audio data;

acquiring image data by controlling an image capturing unit to capture an object image M seconds after recognition of the voice command when a duration of time from the start to end of utterance of the voice command is m seconds, and to capture an object image N seconds (M>N) after recognition of the voice command when the duration of time from the start to end of utterance of the voice command is n seconds (m>n); and controlling a storage unit to store at least one of the audio data which have predetermined time relationships with an utterance timing of the voice command as a voice memo in association with the acquired image data, and to select at least one of the audio data having the predetermined time relationships in accordance with a type of the detected voice command.

10. A non-transitory computer-readable storage medium storing a program for causing a computer to perform or instruct a method for information processing in an image capturing apparatus, the method comprising:

acquiring audio data;

detecting a voice command included in the audio data;

acquiring image data by controlling an image capturing unit to capture an object image when the voice command is detected; and controlling a storage unit to store at least one of the audio data which have predetermined time relationships with an utterance timing of the voice command as a voice memo in association with the acquired image data, wherein, when a duration of time from the start to end of utterance of the voice command is m seconds, the image capturing unit is controlled to capture an object image M seconds after recognition of the voice command, and when the duration of time from the start to end of utterance of the voice command is n seconds (m>n), the image capturing control unit is controlled to capture an object image N seconds (M>N) after recognition of the voice command.

* * * * *